US008553044B2

(12) United States Patent
Chang et al.

(10) Patent No.: US 8,553,044 B2
(45) Date of Patent: Oct. 8, 2013

(54) GRAPHIC RENDERING SYSTEM AND PIXEL UPDATE METHOD THEREOF

(75) Inventors: Chia-Ming Chang, Yonghe (TW); Yi-Ting Lin, Kaohsiung (TW)

(73) Assignee: Institute for Information Industry, Taipei (TW)

( * ) Notice: Subject to any disclaimer, the term of this patent is extended or adjusted under 35 U.S.C. 154(b) by 467 days.

(21) Appl. No.: 12/963,181

(22) Filed: Dec. 8, 2010

(65) Prior Publication Data

US 2012/0133669 A1    May 31, 2012

(30) Foreign Application Priority Data

Nov. 25, 2010 (TW) ................................ 99140741 A

(51) Int. Cl.
*G09G 5/02* (2006.01)

(52) U.S. Cl.
USPC ........... 345/592; 345/589; 345/593; 345/611; 345/613; 345/614; 382/162

(58) Field of Classification Search
None
See application file for complete search history.

(56) References Cited

U.S. PATENT DOCUMENTS

| 7,002,589 B2 * | 2/2006 | Deering ........................ 345/581 |
| 7,495,672 B2 * | 2/2009 | Akenine-Moller et al. .. 345/611 |
| 7,764,833 B2 * | 7/2010 | Elder ........................... 382/166 |

\* cited by examiner

*Primary Examiner* — Antonio A Caschera
(74) *Attorney, Agent, or Firm* — Ping Wang; Andrews Kurth LLP

(57) ABSTRACT

A graphic rendering apparatus includes a processing unit and a storage unit. The storage unit is stored with a piece of information. The piece of information defines a virtual area on a display. A pixel of the display overlaps a part of the virtual area, and the part corresponds to a color. The pixel defines a first boundary, a second boundary, a third boundary, and a fourth boundary. The processing unit decides a first coverage rate, a second coverage rate, a third coverage rate, and a fourth coverage rate of the virtual area on the first boundary, the second boundary, the third boundary, and the fourth boundary, respectively. The processing unit decides a display color of the pixel with reference to the color and the first coverage rate, the second coverage rate, the third coverage rate, and the fourth coverage rate.

20 Claims, 6 Drawing Sheets

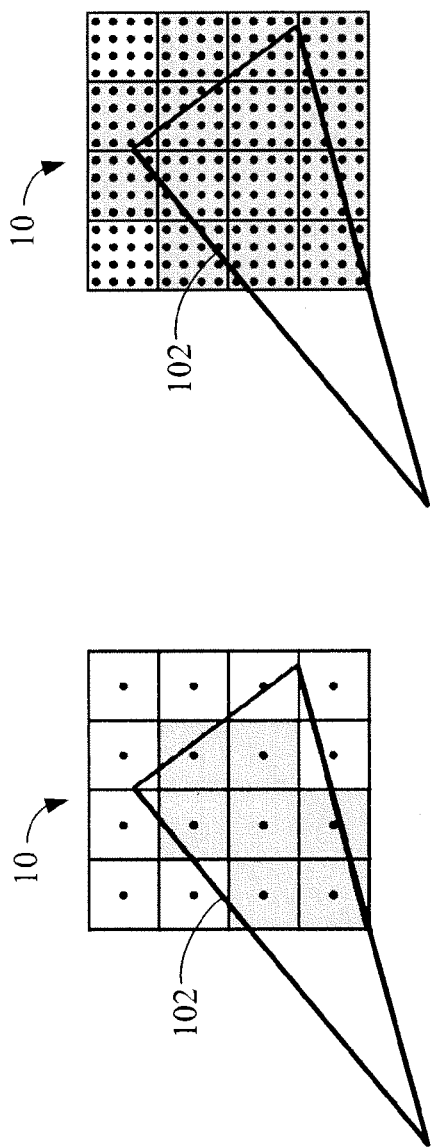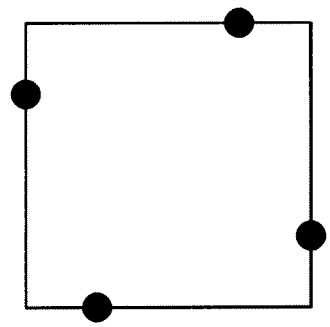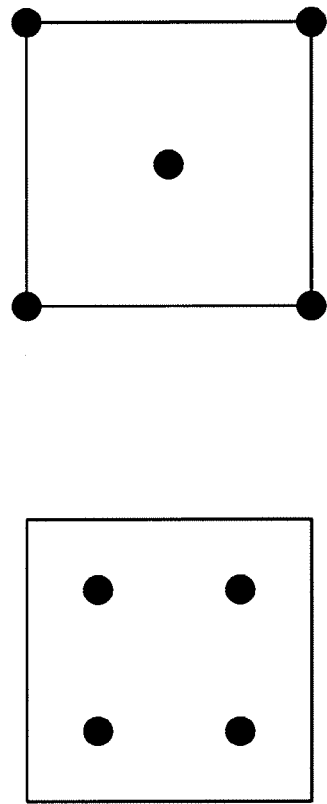

GRAPHIC RENDERING SYSTEM AND PIXEL UPDATE METHOD THEREOF

This application claims priority to Taiwan Patent Application No. 099140741 filed on Nov. 25, 2010, which is hereby incorporated by reference in its entirety.

FIELD

The present invention relates to a graphic rendering system and a pixel update method thereof; more particularly, the present invention relates to a graphic rendering system adopting the anti-aliasing technology and a pixel update method thereof.

BACKGROUND

In recent years, owing to rapid development of computer graphic rendering technologies, these technologies have found wide application in various fields such as in the silver spoon industry, the video games industry, and the like. However, due to limitation of hardware, a high-resolution signal often has to be represented at a low resolution in the computer graphic rendering technologies, and even sometimes positional coordinates of a graphic cannot be calculated accurately. This leads to occurrence of serrations at edges of objects in the display frame, which is known as the "aliasing" phenomenon.

Referring to FIG. 1A, a schematic view illustrating the aliasing phenomenon is shown therein. In FIG. 1A, a display frame 10 comprises sixteen pixels, each of which is represented by a square. The triangle 102 is a virtual area (virtual region), which represents an image to be presented in the display frame 10. When the sampling rate is one sampling point (in FIG. 1A, the black dot in each square represents a sampling point) per pixel, the pixel can only be updated with a color and a luminance sampled at the sampling point. When this sampling rate is used to sample the triangle 102 and sample values are used to update pixels of the display frame 10, a frame displayed in FIG. 1A will be presented, where the gray squares represents the triangle 102. As can be seen from FIG. 1A, this sampling rate causes occurrence of the aliasing phenomenon.

Increasing the sampling rate is known as a technical means to alleviate the aliasing phenomenon, and schematic views of this concept are shown in FIGS. 1B, 1C, 1D, and 1E. FIG. 1B depicts a scenario where the sampling rate is sixteen sampling points per pixel, and FIG. 1C depicts a scenario where the sampling rate is four sampling points per pixel. Although increasing the sampling rate may mitigate the aliasing phenomenon, it also increases the volume of data to be stored and computed. In order to ease the burden imposed by the increased sampling rate on the system, a technology of sharing sampling points has been developed, which is schematically shown in FIG. 1D and FIG. 1E. In FIG. 1D, the sampling rate is five sampling points per pixel. Because four of the sampling points are located at corners of this pixel, data corresponding to the four sampling points may also be used for adjacent pixels. In FIG. 1E, the sampling rate is four sampling points per pixel, and data corresponding to the four sampling points may also be used for adjacent pixels. Although the technical means of increasing the sampling rate shown in FIG. 1D and FIG. 1E reduces the volume of data to be stored and computed significantly, quality of the resulting frames still cannot fulfill the requirements in practical use.

Accordingly, a need still exists in the art for a graphic rendering system and a pixel update method thereof that can fulfill the requirements on display quality by solving the aliasing problem and, meanwhile, eliminate the need of storing and processing a large volume of data.

SUMMARY

An objective of the present invention is to provide a graphic rendering system, which comprises a storage unit and a processing unit. The storage unit is configured to store a piece of information, wherein the piece of information defines a virtual area (virtual region) in a display frame. The processing unit is configured to determine that a pixel in the display frame overlaps a part of the virtual area according to the piece of information. The part corresponds to a color. The pixel defines a first boundary, a second boundary, a third boundary, and a fourth boundary. The processing unit is further configured to decide a first coverage rate of the virtual area (virtual region) on the first boundary, a second coverage rate of the virtual area on the second boundary, a third coverage rate of the virtual area on the third boundary, and a fourth coverage rate of the virtual area on the fourth boundary. The processing unit is further configured to decide a display color of the pixel according to the first color, the first coverage rate, the second coverage rate, the third coverage rate, and the fourth coverage rate.

Another objective of the present invention is to provide a pixel update method for a graphic rendering system. The graphic rendering system comprises a processing unit and a storage unit. The storage unit stores a piece of information, and the piece of information defines a virtual area in a display frame. The pixel update method comprises the following steps of: (a) enabling the processing unit to determine that a pixel in the display frame overlaps a part of the virtual area according to the piece of information, wherein the part corresponds to a color, and the pixel defines a first boundary, a second boundary, a third boundary, and a fourth boundary; (b) enabling the processing unit to decide a first coverage rate of the virtual area on the first boundary; (c) enabling the processing unit to decide a second coverage rate of the virtual area on the second boundary; (d) enabling the processing unit to decide a third coverage rate of the virtual area on the third boundary; (e) enabling the processing unit to decide a fourth coverage rate of the virtual area on the fourth boundary; and (f) enabling the processing unit to decide a display color of the pixel with reference to the color, the first coverage rate, the second coverage rate, the third coverage rate, and the fourth coverage rate.

According to the above descriptions, for a virtual area to be presented in a display frame, the present invention firstly decides coverage rates of the virtual area on boundaries of each pixel. The present invention then decides a display color of the pixel with reference to a color of a part of the virtual area that overlaps the pixel and the coverage rates on the four boundaries of the pixel. Since the present invention increases the sampling rate, the aliasing problem is solved. Moreover, since the calculation of the present invention is based on coverage rates on the four boundaries of the pixel, so the coverage rates of the four boundaries may be shared by adjacent pixels. Therefore, an excessive volume of data to be computed and stored is avoided.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 1A is a schematic view illustrating the aliasing phenomenon;

FIGS. 1B, 1C, 1D, and 1E are schematic views illustrating scenarios of increasing of the sampling rate;

DESCRIPTION OF THE PREFERRED EMBODIMENT

In the following description, the present invention will be explained with reference to embodiments thereof. However, these embodiments are not intended to limit the present invention to any specific environment, applications or particular implementations described in these embodiments. Therefore, description of these embodiments is only for purpose of illustration rather than to limit the present invention. It should be appreciated that, in the following embodiments and the attached drawings, elements not directly related to the present invention are omitted from depiction.

Figure 2A:
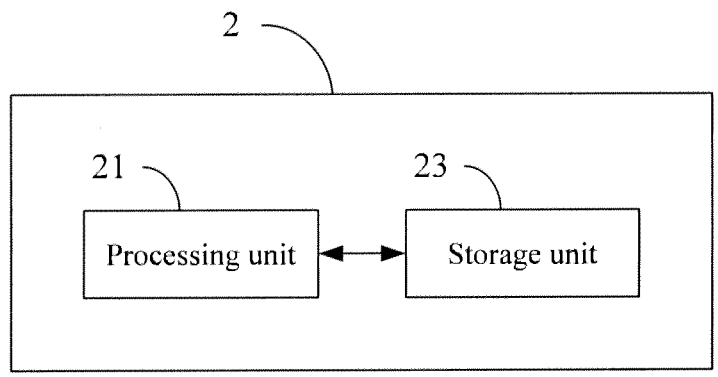
FIG. 2A is a schematic view illustrating internal components of a graphic rendering system according to a first embodiment.

A first embodiment of the present invention is a graphic rendering system 2, a schematic view of whose internal components is shown in FIG. 2A. The graphic rendering system 2 comprises a processing unit 21 and a storage unit 23. The processing unit 21 may be either any of various processors, central processing units (CPUs), microprocessors or other computing devices which are well-known to those of ordinary skill in the art or a circuit. The storage unit 23 may be either a memory, a floppy disk, a hard disk, a compact disk (CD), a mobile disk, a magnetic tape, a database accessible to networks, or any other storage media with the same function and well-known to those of ordinary skill in the art or a circuit.

Figure 2B:
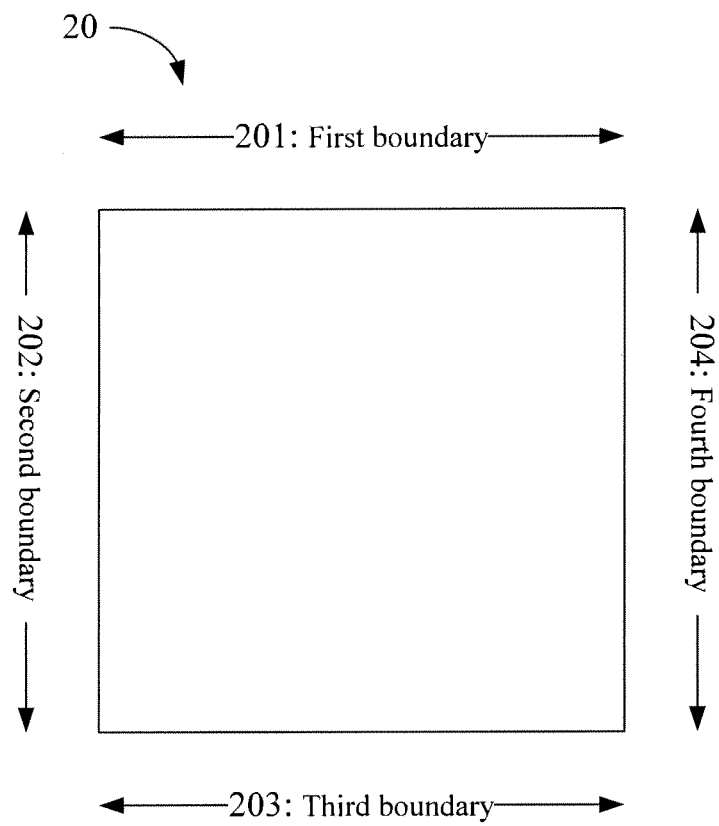
FIG. 2B is a schematic view illustrating a pixel in a display frame according to the first embodiment.

FIG. 2B depicts a pixel 20 in a display frame according to the first embodiment. The pixel 20 defines a first boundary 201, a second boundary 202, a third boundary 203, and a fourth boundary 204. It shall be appreciated that the terms "first," "second," "third," and "fourth" used herein for the first boundary 201, the second boundary 202, the third boundary 203, and the fourth boundary 204 are only intended to distinguish the four different boundaries defined by the pixel 20 from each other.

Figure 2C:
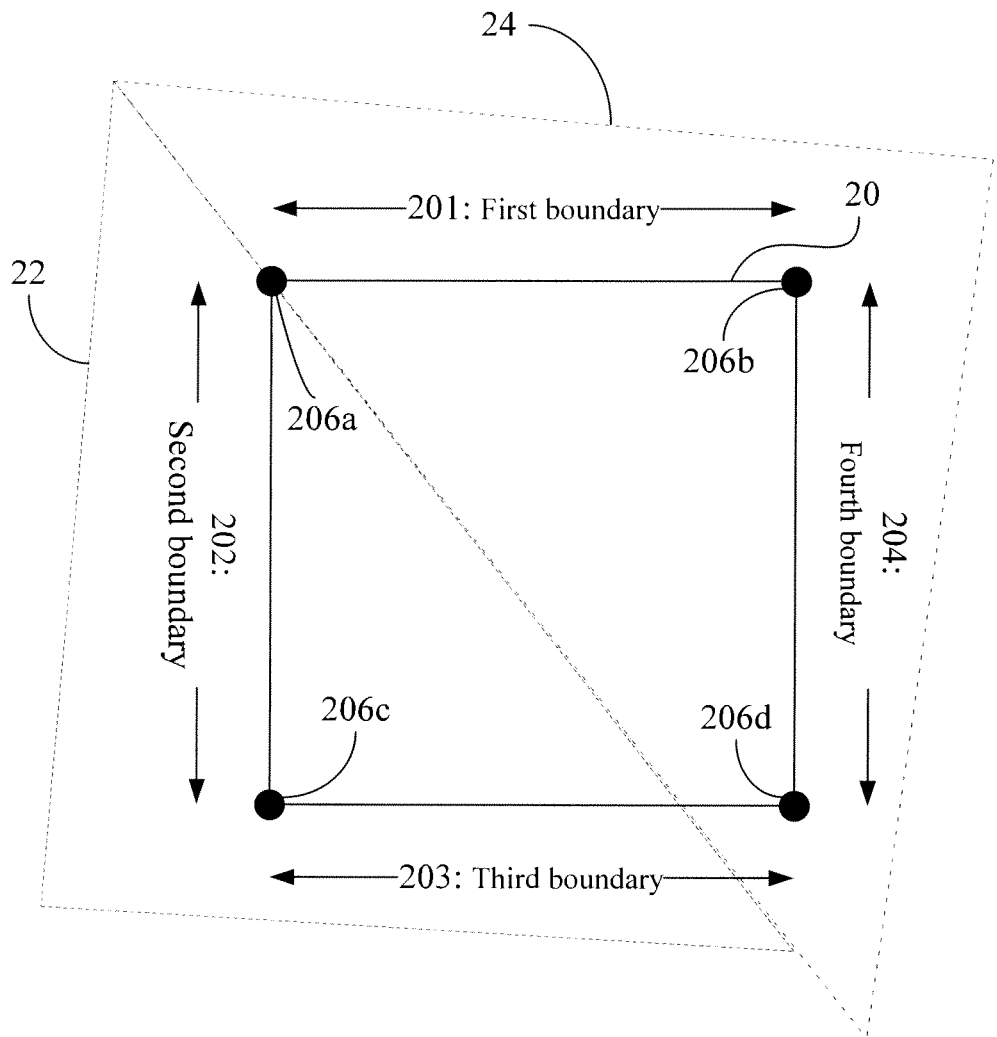
FIG. 2C is a schematic view illustrating a virtual area according to the first embodiment.

The storage unit 23 stores a piece of first information and a piece of second information stored therein. As shown in FIG. 2C, the piece of first information defines a first virtual area 22 in the display frame, and the piece of second information defines a second virtual area 24 in the display frame. Each of the first virtual area 22 and the second virtual area 24 represents an image to be presented in the display frame. If the graphic rendering system 2 is used for 3D graphic rendering, the piece of first information and the piece of second information may be primitives of a 3D model. Those of ordinary skill in the art will readily appreciate that, the piece of first information and the piece of second information may be of many different forms. For example, the piece of first information may be coordinates of three vertices of the first virtual area 22, or edge functions of three edges of the first virtual area 22. The present invention has no limitation on forms of the piece of first information and the piece of second information, so no further description will be made herein. Similarly, the terms "first" and "second" used herein for the piece of first information and the piece of second information are only intended to distinguish the piece of first information and the piece of second information from each other.

The processing unit 21 reads the piece of first information from the storage unit 23 and determines whether the pixel 20 overlaps a part of the first virtual area 22 defined by the piece of first information according to the piece of first information. This implies that the processing unit 21 must determine whether to adjust a color of the pixel 20 correspondingly when the first virtual area 22 is to be presented in the display frame. The processing unit 21 may employ different technical means to determine whether the pixel 20 overlaps a part of the first virtual area 22 defined by the piece of first information. For instance, the processing unit 21 may determines whether at least one of the first corner point 206a, the second corner point 206b, the third corner point 206c, and the fourth corner point 206d is located within the first virtual area 22 according to a first corner point 206a, a second corner point 206b, a third corner point 206c, and a fourth corner point 206d defined by the pixel 20. If the determination result is "yes", then the processing unit 21 determines that the pixel 20 overlaps a part of the first virtual area 22. If the piece of first information comprises a plurality of edge functions, then the processing unit 21 utilizes these edge functions to determine whether at least one of the first corner point 206a, the second corner point 206b, the third corner point 206c, and the fourth corner point 206d is located within the first virtual area 22.

The edge function is a concept well-known to those of ordinary skill in the art, so no further description will be made herein. Similarly, the terms "first," "second," "third," and "fourth" used herein for the first corner point, the second corner point, the third corner point, and the fourth corner point are only intended to distinguish the four different corner points from each other.

As shown in FIG. 2C, in this embodiment, the pixel 20 overlaps a part of the first virtual area 22, and this part corresponds to a first color, e.g., green color. That is, the first virtual area 22 will be presented in green color in the pixel 20 of the display frame. Then, the processing unit 21 decides a first coverage rate of the first virtual area 22 on the first boundary 201, a second coverage rate of the first virtual area 22 on the second boundary 202, a third coverage rate of the first virtual area 22 on the third boundary 203, and a fourth coverage rate of the first virtual area 22 on the fourth boundary 204. It shall also be appreciated that the terms "first," "second," "third," and "fourth" used herein for the first coverage rate, the second coverage rate, the third coverage rate, and the fourth coverage rate are only intended to distinguish the four different coverage rates corresponding to the first boundary 201, the second boundary 202, the third boundary 203, and the fourth boundary 204 from each other.

Next, the processing unit 21 decides a display color of the pixel 20 with reference to the first color, the first coverage rate, the second coverage rate, the third coverage rate, and the fourth coverage rate. For instance, the processing unit 21 may firstly decide a first boundary color of the first boundary 201 according to the first coverage rate and the first color, decide a second boundary color of the second boundary 202 according to the second coverage rate and the first color, decide a third boundary color of the third boundary 203 according to the third coverage rate and the first color, and decide a fourth boundary color of the fourth boundary 204 according to the fourth coverage rate and the first color. Then, the processing unit 21 decides a display color of the pixel 20 with reference to the first boundary color, the second boundary color, the third boundary color, and the fourth boundary color.

Now, this will be described with reference to an exemplary example. For ease of description, the first coverage rate, the second coverage rate, the third coverage rate, and the fourth coverage rate are denoted as a %, b %, c %, and d %, respectively. Assume that the first color is green, an RGB color model of which is (R, G, B)=(0, 255, 0). Then the processing unit calculates ⌈(0,255,0)×a %⌉, ⌈(0,255,0)×b %⌉, ⌈(0,255, 0)×c %⌉ and ⌈(0,255,0)×d %⌉, and takes the resulting values as the first boundary color, the second boundary color, the third boundary color, and the fourth boundary color, respectively. The first boundary color, the second boundary color, the third boundary color, and the fourth boundary color corresponding to the first virtual area 22 will be temporarily stored by the storage unit 23.

At a subsequent rendering stage, the processing unit 21 will read the first boundary color, the second boundary color, the third boundary color, and the fourth boundary color from the storage unit 23 and divide a sum of the first boundary color, the second boundary color, the third boundary color, and the fourth boundary color by four to obtain a value for use as the display color of the pixel 20. Assuming that a %=0%, b %=100%, c %=75% and d %=0%, then the first boundary color, the second boundary color, the third boundary color, and the fourth boundary color will be (0, 0, 0), (0, 255, 0), (0, 192, 0), and (0, 0, 0), respectively. In this case, the display color of the pixel 20 is (0, 112, 0). In other examples, instead of calculating the first boundary color, the second boundary color, the third boundary color, and the fourth boundary color, the processing unit 21 may also choose to calculate the display color of the pixel 20 according to the first color, the first coverage rate, the second coverage rate, the third coverage rate, and the fourth coverage rate directly. In particular, the processing unit 21 may calculate ⌈(a %+b %+c %+d %)/4⌉ at first, and then multiply it with the value of the first color (i.e., (0, 255, 0)) to obtain the display color of the pixel 20 (i.e., (0, 112, 0)).

In this embodiment, since there is still unprocessed information (i.e., the piece of second information) in the storage unit 23, the processing unit 21 then reads the piece of second information from the storage unit 23 and determines whether the pixel 20 overlaps a part of the second virtual area 24 defined by the piece of second information according to the piece of second information.

As shown in FIG. 2C, in this embodiment, the pixel 20 overlaps a part of the second virtual area 24, and this part of the second virtual area 24 corresponds to a second color, e.g., red color. That is, the second virtual area 24 will be presented in red color in the pixel 20. Then, the processing unit 21 decides a fifth coverage rate of the second virtual area 24 on the first boundary 201, a sixth coverage rate of the second virtual area 24 on the second boundary 202, a seventh coverage rate of the second virtual area 24 on the third boundary 203, and an eighth coverage rate of the second virtual area 24 on the fourth boundary 204. It shall be appreciated that the terms "first" and "second" used herein for the first color and the second color are only intended to distinguish the two colors corresponding to the first virtual area 22 and the second virtual area 24 from each other. In addition, the terms "fifth," "sixth," "seventh," and "eighth" used herein for the fifth coverage rate, the sixth coverage rate, the seventh coverage rate, and the eighth coverage rate are only intended to distinguish the four different coverage rates corresponding to the first boundary 201, the second boundary 202, the third boundary 203, and the fourth boundary 204 from each other. Next, according to the second color, the fifth coverage rate, the sixth coverage rate, the seventh coverage rate and the eighth coverage rate corresponding to the second virtual area 24, the processing unit 21 decides an updating color of the pixel 20 and updates the display color of the pixel 20 with this updating color.

Now, this will be described also with reference to the aforesaid exemplary example. For ease of description, the fifth coverage rate, the sixth coverage rate, the seventh coverage rate, and the eighth coverage rate are denoted as e %, f %, g %, and h % respectively. Assume that the second color is red, an RGB color model of which is (R, G, B) (255, 0, 0). Then the processing unit 21 calculates ⌈(255,0,0)×e %⌉, ⌈(255,0,0)×f %⌉, ⌈(255,0,0)×g %⌉ and ⌈(255,0,0)×h %⌉, and takes the resulting values as the first boundary color, the second boundary color, the third boundary color, and the fourth boundary color corresponding to the second virtual area 24, respectively. The first boundary color, the second boundary color, the third boundary color, and the fourth boundary color corresponding to the second virtual area 24 will be temporarily stored by the storage unit 23.

At a subsequent rendering stage, the processing unit 21 will read from the storage unit 23 the first boundary color, the second boundary color, the third boundary color, and the fourth boundary color corresponding to the second virtual area 24 and divide a sum of the first boundary color, the second boundary color, the third boundary color, and the fourth boundary color by four to obtain a value for use as the updating color of the pixel 20. Assuming that e %=100%, f %=0, g %=25%, and h %=100%, then the first boundary color, the second boundary color, the third boundary color, and the fourth boundary color corresponding to the second virtual area 24 will be (255, 0, 0), (0, 0, 0), (64, 0, 0), and (255, 0, 0), respectively. In this case, the updating color of the pixel 20 is (144, 0, 0). Similarly, in other examples, instead of calculating the first boundary color, the second boundary color, the third boundary color, and the fourth boundary color corresponding to the second virtual area 24, the processing unit 21 may also choose to calculate the display color of the pixel 20 according to the second color, the fifth coverage rate, the sixth coverage rate, the seventh coverage rate, and the eighth coverage rate directly. Then, by using the updating color of (144, 0, 0), the processing unit 21 updates the display color of the pixel 20 into (144, 112, 0); i.e., the updating color (144, 0, 0) plus the original display color (0, 112, 0) of the pixel 20 is used as the updated display color.

As can be known from the above descriptions, for each virtual area corresponding to the pixel 20, the processing unit 21 calculates coverage rates of the virtual area on the first boundary 201, the second boundary 202, the third boundary 203, and the fourth boundary 204, respectively. These coverage rates reflect in what percentage the color corresponding to the virtual area should be presented in the pixel 20. According to this concept, if a virtual area entirely overlaps the pixel 20 (i.e., the pixel 20 is entirely contained in the virtual area), the coverage rates on the four boundaries all become 100%, which means that the color of the virtual area shall be fully presented in the pixel 20.

Therefore, in order to improve the processing efficiency, when the processing unit 21 determines that a virtual area entirely overlaps the pixel 20 (i.e., the first corner point 206a, the second corner point 206b, the third corner point 206c, and the fourth corner point 206d are all located within the virtual area), the color of the virtual area will be designated as the display color of the pixel 20 directly instead of analyzing coverage rates on the boundaries; and only when the processing unit 21 determines that a virtual area partially overlaps the pixel 20 (i.e., at least one of the first corner point 206a, the second corner point 206b, the third corner point 206c and the fourth corner point 206d is located within the virtual area, while at least another of them is located outside the virtual area), the coverage rates on the boundaries are analyzed and then used to calculate the display color of the pixel 20.

With the aforesaid arrangement and operations, the first embodiment can calculate the display color of the pixel according to the coverage rates of the virtual area on the four boundaries of the pixel and the boundary colors. If there is a pixel adjacent to this pixel, then information of this pixel including the coverage rates and boundary colors may also be used for the adjacent pixel. Hence, the first embodiment can not only solve the aliasing problem, but also reduce the volume of data to be computed and stored by sharing such boundary information among adjacent pixels.

A second embodiment of the present invention is also a graphic rendering system 2, which is adapted to decide a display color of a pixel. The second embodiment differs from the first embodiment in how the first coverage rate of the virtual area on the first boundary 201, the second coverage rate of the virtual area on the second boundary 202, the third coverage rate of the virtual area on the third boundary 203, and the fourth coverage rate of the virtual area on the fourth boundary 204 are calculated. Hereinafter, only the differences of the second embodiment from the first embodiment will be described.

Figure 3:
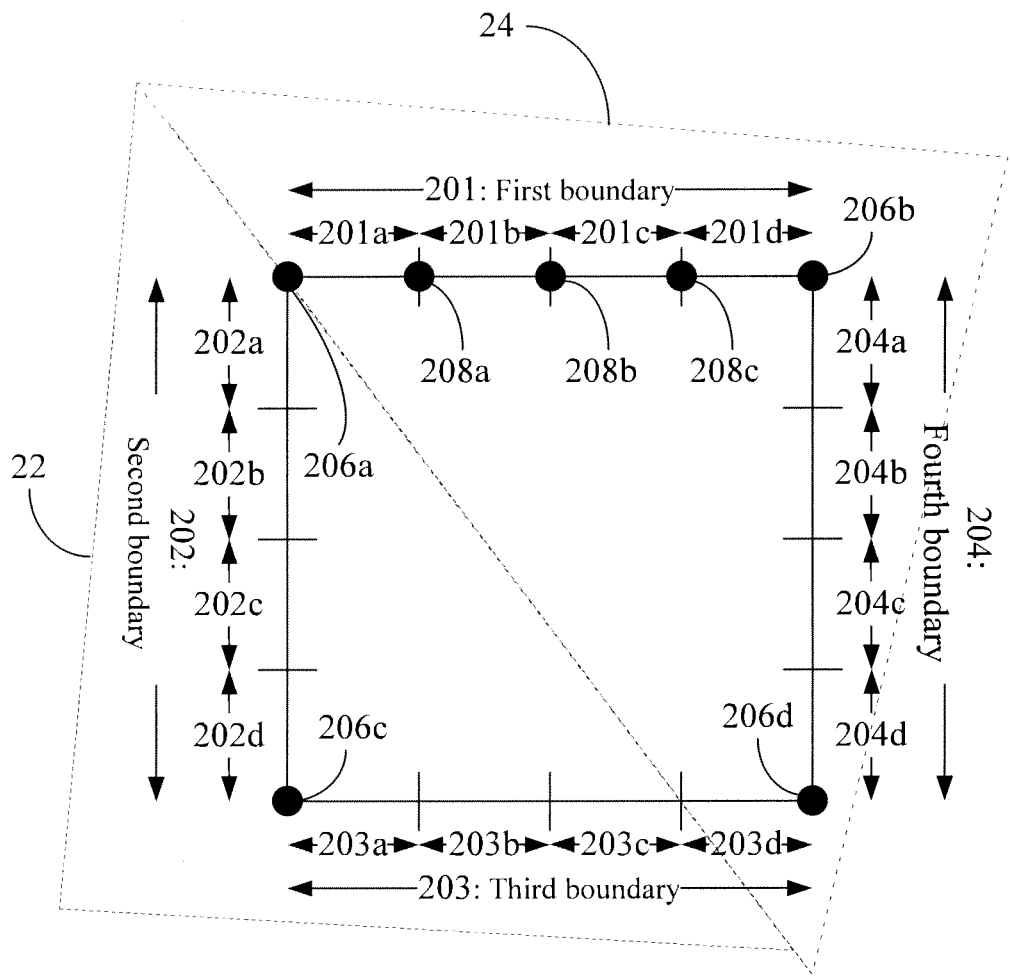
FIG. 3 is a schematic view illustrating a pixel in a display frame according to a second embodiment.

Referring to FIG. 3, there is shown a schematic view depicting the pixel 20 in the display frame according to the second embodiment. In this embodiment, the first boundary 201 of the pixel 20 defines four sub-boundaries 201a, 201b, 201c, 201d, the second boundary 202 defines four sub-boundaries 202a, 202b, 202c, 202d, the third boundary 203 defines four sub-boundaries 203a, 203b, 203c, 203d, and the fourth boundary 204 defines four sub-boundaries 204a, 204b, 204c, and 204d.

Next, the processing unit 21 determines a relative positional relationship between each of the four sub-boundaries 201a, 201b, 201c, 201d of the first boundary 201 and the first virtual area 22 according to the piece of first information. Then, according to these relative positional relationships, the processing unit 21 calculates the first coverage rate of the first virtual area 22 on the first boundary 201. Specifically, for each of the sub-boundaries 201a, 201b, 201c, 201d, the processing unit 21 determines whether the sub-boundary is at least partially located within the first virtual area 22.

If the sub-boundary is at least partially located within the first virtual area 22, then the sub-boundary will be considered as being located within the first virtual area 22. Further speaking, the processing unit 21 can determine whether the sub-boundaries 201a, 201b, 201c, 201d are located within the first virtual area 22 by determining whether endpoints 208a, 208b, 208c and the corner points 206a, 206b defined by the first boundary 201 are located within the first virtual area 22. When at least one of the endpoints or the corner points at both ends of a sub-boundary is located within the first virtual area 22, the sub-boundary is considered to be within the first virtual area 22.

Similarly, the processing unit 21 determines a relative positional relationship between each of the sub-boundaries 202a, 202b, 202c, 202d of the second boundary 202 and the first virtual area 22 according to the piece of first information. The processing unit 21 then calculates the second coverage rate of the first virtual area 22 on the second boundary 202 according to these relative positional relationships. The processing unit 21 determines a relative positional relationship between each of the sub-boundaries 203a, 203b, 203c, 203d of the third boundary 203 and the first virtual area 22 according to the piece of first information and then calculates the third coverage rate of the first virtual area 22 on the third boundary 203 according to these relative positional relationships. The processing unit 21 determines a relative positional relationship between each of the sub-boundaries 204a, 204b, 204c, 204d of the fourth boundary 204 and the first virtual area 22 according to the piece of first information and then calculates the fourth coverage rate of the first virtual area 22 on the fourth boundary 204 according to these relative positional relationships.

Through what described above, the second embodiment can calculate coverage rates of a virtual area on four boundaries of a pixel in an efficient way. Likewise, if there is a pixel adjacent to this pixel, information of this pixel including the coverage rates and the boundary colors may also be used for the adjacent pixel.

Figure 4:
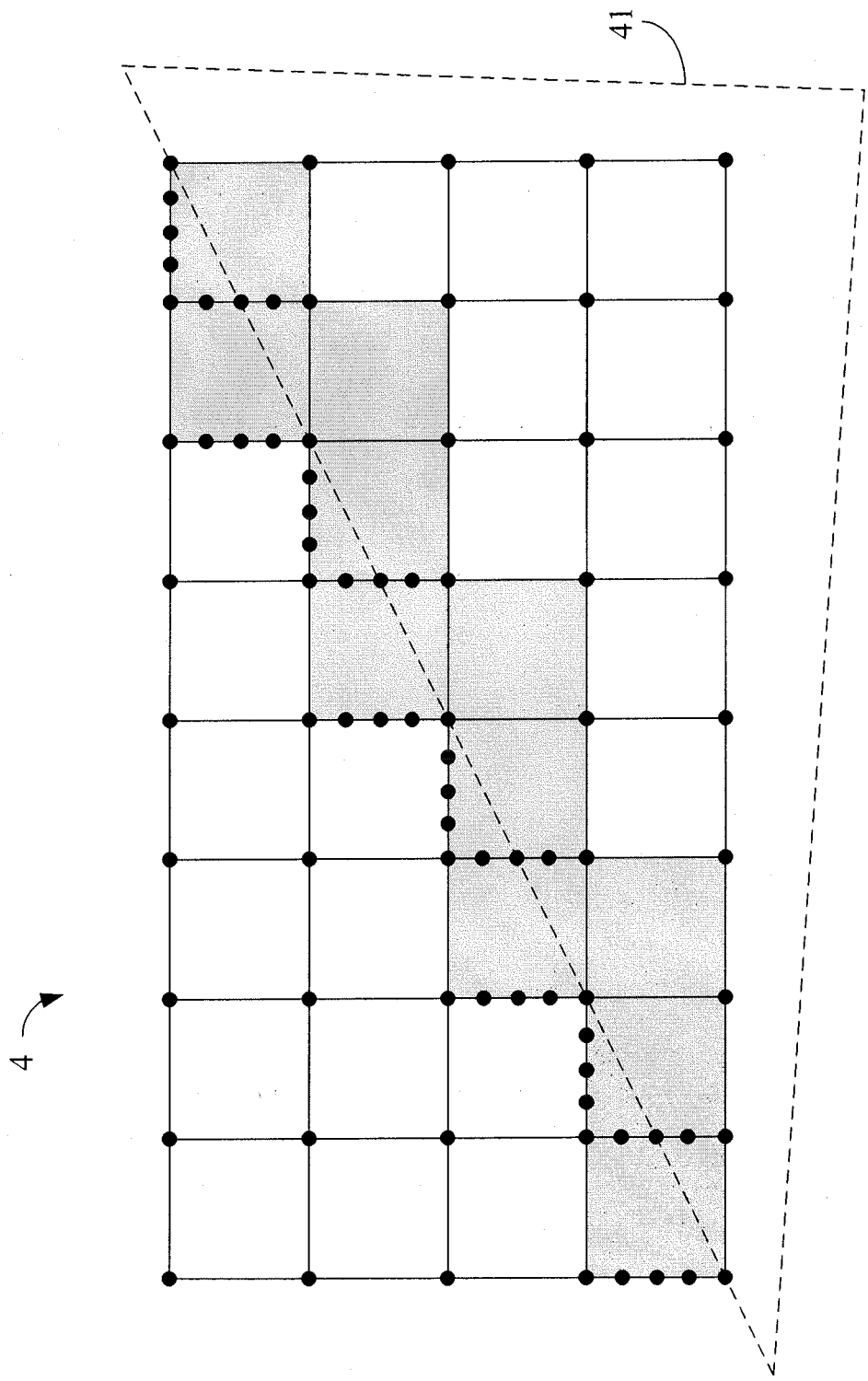
FIG. 4 is a schematic view illustrating a pixel in a display frame according to a third embodiment.

A third embodiment of the present invention is also a graphic rendering system 2, which is adapted to decide a display color for a plurality of pixels in a display frame. Referring to FIG. 4, a display frame 4 comprises thirty two pixels (represented by thirty two squares in FIG. 4), and a virtual area 41 represents an image to be presented in the display frame 4. Information (e.g., edge functions) defining the virtual area 41 is stored in the storage unit 23.

For each pixel, the graphic rendering system 2 of this embodiment determines whether the pixel partially overlaps the virtual area 41 (i.e., determines whether a boundary of the virtual area 41 intersects with the pixel) according to the information defining the virtual area 41 and the four corner points of the pixel. For each pixel, if at least one of the four corner points of the pixel is located within the virtual area 41 and at least another of them is located outside the virtual area 41, then the pixel is said to partially overlap the virtual area 41. Therefore, at this stage, the processing unit 21 needs to process $(4+1)\times(8+1)\times3=135$ endpoints, where the multiplier 3 represents three edge functions defining the virtual area 41.

In FIG. 4, eleven gray squares represent pixels intersected with boundaries of the virtual area 41, and further processing needs to be made on these pixels. The processing is just as described in the first and the second embodiments, so no further description will be made herein. Nine pixels at the bottom right portion of the display frame 4 (i.e., the nine white squares at the bottom right portion) are entirely located within the virtual area 41, so the color corresponding to the virtual area 41 will be displayed by these pixels directly and, thus, no further processing needs to be made thereon. Twelve pixels at the top left portion of the display frame 4 (i.e., the twelve white squares at the top left portion) are entirely located outside the virtual area 41, so these pixels are not affected by the color corresponding to the virtual area 41 and will present their original display colors; therefore, for these pixels, no further processing needs to be made thereon.

Next, the volume of data to be stored in this embodiment will be described. Assuming that the display frame has a resolution of W×H, then the volume of data to be stored in the present invention is $(W\times(H+1)+H\times(W+1))\times(1+CovergeBit)$, where 1 represents a normalized value of the 32-bit R, G, B values and the parameter CovergeBit represents a normalized value of 4-bit coverage rates of the four boundaries. Accordingly, when the sampling technology depicted in FIG. 1A (i.e., without adopting the anti-aliasing technology) is used to sample the virtual area 41, the volume of data to be stored is $8\times4=32$. As to this embodiment, the volume of data to be stored is $(8\times(4+1)+4\times(8+1))\times(1+4/32)=85.5$, which is 85.5/32=2.671875 times as that of the sampling technology depicted in FIG. 1A.

Figure 5:
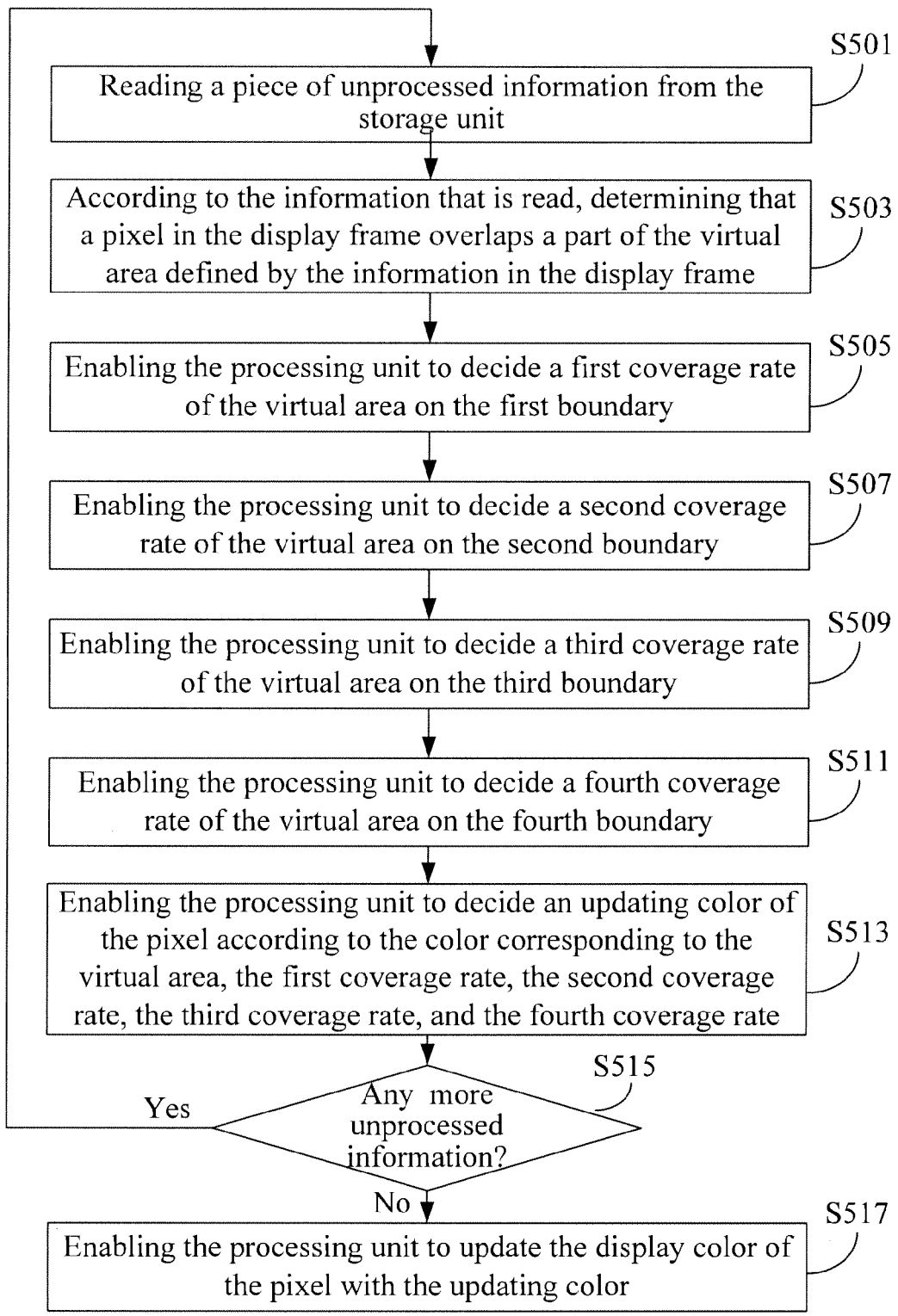
FIG. 5 is a schematic flowchart according to a fourth embodiment.

A fourth embodiment of the present invention is a pixel update method, a flowchart of which is depicted in FIG. 5. This pixel update method is used for a graphic rendering system, for example, the graphic rendering system 2 described in the first to the third embodiments. The graphic rendering system comprises a processing unit and a storage unit. The storage unit has a plurality of pieces of information stored therein, each of which defines a virtual area in a display frame.

Firstly, step S501 is executed to enable the processing unit to read a piece of unprocessed information from the storage unit. Next, step S503 is executed to enable the processing unit to determine that a pixel in the display frame overlaps a part of the virtual area defined by the information in the display frame according to the information that is read, wherein this part corresponds to a color. For example, because the pixel defines four corner points (i.e., a first corner point, a second corner point, a third corner point, and a fourth corner point), step S503 may determine whether at least one of the four corner points is located within the virtual area according to the information that is read. When one of the corner points is located with the virtual area, the pixel is said to at least partially overlap the virtual area. It shall be appreciated that step S503 may be configured to only determine cases where the pixel partially overlaps the virtual area but not cases where the pixel entirely overlaps the virtual area in other examples. In those examples, step S503 is to determine whether one of the four corner points is located within the virtual area and also another corner point is located outside the virtual area. If the determination result is "yes", then the pixel is said to partially overlap the virtual area. Furthermore, when the information defining the virtual area is in form of edge functions, step S503 will utilize these edge functions for determination.

In this embodiment, the pixel defines a first boundary, a second boundary, a third boundary, and a fourth boundary. Next, the pixel update method executes steps S505, S507, S509, and S511 to enable the processing unit to decide a first coverage rate of the virtual area on the first boundary, a second coverage rate of the virtual area on the second boundary, a third coverage rate of the virtual area on the third boundary, and a fourth coverage rate of the virtual area on the fourth boundary respectively. It shall be appreciated that the orders that the steps S505, S507, S509 and S511 are executed may be swapped with each other.

Steps S505, S507, S509 and S511 can be implemented in different ways. For example, the pixel update method can define the first boundary to have a plurality of sub-boundaries, define the second boundary to have a plurality of sub-boundaries, define the third boundary to have a plurality of sub-boundaries, and define the fourth boundary to have a plurality of sub-boundaries. At this point, step S505 is executed to enable the processing unit to determine a relative positional relationship between each of the sub-boundaries of the first boundary and the virtual area (i.e., whether they intersect with each other) according to the information that is read, and then enable the processing unit to calculate the first coverage rate of the virtual area on the first boundary according to these relative positional relationships. Likewise, step S507 is executed to enable the processing unit to determine a relative positional relationship between each of the sub-boundaries of the second boundary and the virtual area (i.e., whether they intersect with each other) according to the information that is read, and then enable the processing unit to calculate the second coverage rate of the virtual area on the second boundary according to these relative positional relationships. Step S509 is executed to enable the processing unit to determine a relative positional relationship between each of the sub-boundaries of the third boundary and the virtual area (i.e., whether they intersect with each other) according to the information that is read, and then enable the processing unit to calculate the third coverage rate of the virtual area on the third boundary according to these relative positional relationships. Step S511 is executed to enable the processing unit to determine a relative positional relationship between each of the sub-boundaries of the fourth boundary and the virtual area (i.e., whether they intersect with each other) according to the information that is read, and then enable the processing unit to calculate the fourth coverage rate of the virtual area on the fourth boundary according to these relative positional relationships.

Then, the pixel update method executes step S513 to enable the processing unit to decide an updating color of the pixel according to the color corresponding to the virtual area, the first coverage rate, the second coverage rate, the third coverage rate, and the fourth coverage rate. For example, the pixel updating color of the pixel may indicate the updating colors of the four boundaries. When the pixel updating color indicates the updating colors of the four boundaries, step S513 enables the processing unit to decide a first boundary color of the first boundary according to the first coverage rate and the color, decide a second boundary color of the second boundary according to the second coverage rate and the color, decide a third boundary color of the third boundary according to the third coverage rate and the color and decide a fourth boundary color of the fourth boundary according to the fourth coverage rate and the color.

Afterwards, the pixel update method executes step S515 to enable the processing unit to determine whether there is still unprocessed information. If the determination result in step S515 is "yes", then the pixel update method repeats step S501 to step S513. Otherwise, if the determination result in step S515 is "no", then the pixel update method enables the processing unit to update the display color of the pixel according to the updating color. In step S517. For example, when the updating color comprises the first boundary color, the second boundary color, the third boundary color and the fourth boundary color, a color obtained by dividing a sum of the first boundary color, the second boundary color, the third boundary color and the fourth boundary color by four may be used to update the display color in step S517.

The pixel update method described in the fourth embodiment may be implemented by a computer program product. When the computer program product is loaded into the graphic rendering system and a plurality of codes comprised therein is executed, the pixel update method described in the fourth embodiment can be accomplished. The aforesaid computer program product may be stored in a tangible machine-readable medium, such as a read only memory (ROM), a flash memory, a floppy disk, a hard disk, a compact disk (CD), a mobile disk, a magnetic tape, a database accessible to networks, or any other storage media with the same function and well known to those skilled in the art.

In addition to the aforesaid steps, the fourth embodiment can also execute all the operations and functions set forth in the first to the third embodiments. How the fourth embodiment executes these operations and functions will be readily appreciated by those of ordinary skill in the art based on the explanation of the first to the third embodiments, and thus will not be further described herein.

According to descriptions of the above embodiments, for a virtual area to be presented in a display frame, the present invention firstly decides coverage rates of the virtual area on boundaries of each pixel, and then according to a color corresponding to the virtual area and the coverage rates on the four boundaries of the pixel, decides a display color of the pixel. Because the present invention increases the sampling rate, the aliasing problem is solved. Moreover, because calculation of the present invention is based on coverage rates on the four boundaries of the pixel and the coverage rates of the four boundaries may be shared by adjacent pixels, an excessive volume of data to be computed and stored is avoided.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A graphic rendering system, comprising:
   a storage unit, being configured to store a piece of first information, wherein the piece of first information defines a first virtual area in a display frame; and
   a processing unit, being configured to determine that a pixel in the display frame overlaps a part of the first virtual area according to the piece of first information, wherein the part corresponds to a first color, the pixel defines a first boundary, a second boundary, a third boundary, and a fourth boundary, the processing unit is further configured to decide a first coverage rate of the first virtual area on the first boundary, a second coverage rate of the first virtual area on the second boundary, a third coverage rate of the first virtual area on the third boundary, and a fourth coverage rate of the first virtual area on the fourth boundary, and the processing unit is further configured to decide a display color of the pixel with reference to the first color, the first coverage rate, the second coverage rate, the third coverage rate, and the fourth coverage rate.

2. The graphic rendering system as claimed in claim 1, wherein the pixel further defines a first corner point, a second corner point, a third corner point, and a fourth corner point, and the processing unit determines that the pixel overlaps the part of the first virtual area by determining that at least one of the first corner point, the second corner point, the third corner point, and the fourth corner point is located within the first virtual area.

3. The graphic rendering system as claimed in claim 2, wherein the piece of first information comprises a plurality of edge functions, and the processing unit determines that at least one of the first corner point, the second corner point, the third corner, point and the fourth corner point is located within the first virtual area according to the edge functions.

4. The graphic rendering system as claimed in claim 1, wherein the pixel further defines a first corner point, a second corner point, a third corner point, and a fourth corner point, and the processing unit determines that the pixel overlaps the part of the first virtual area by determining that at least one of the first corner point, the second corner point, the third corner point, and the fourth corner point is located within the first virtual area and at least another of the first corner point, the second corner point, the third corner point, and the fourth corner point is located outside the virtual area.

5. The graphic rendering system as claimed in claim 1, wherein the first boundary defines a plurality of sub-boundaries, and the processing unit determines a relative positional relationship between each of the sub-boundaries and the first virtual area according to the piece of first information and calculates the first coverage rate of the first virtual area on the first boundary according to the relative positional relationships.

6. The graphic rendering system as claimed in claim 1, wherein the second boundary defines a plurality of sub-boundaries, and the processing unit determines a relative positional relationship between each of the sub-boundaries and the first virtual area according to the piece of first information and calculates the second coverage rate of the first virtual area on the second boundary according to the relative positional relationships.

7. The graphic rendering system as claimed in claim 1, wherein the third boundary defines a plurality of sub-boundaries, and the processing unit determines a relative positional relationship between each of the sub-boundaries and the first virtual area according to the piece of first information and calculates the third coverage rate of the first virtual area on the third boundary according to the relative positional relationships.

8. The graphic rendering system as claimed in claim 1, wherein the fourth boundary defines a plurality of sub-boundaries, and the processing unit determines a relative positional relationship between each of the sub-boundaries and the first virtual area according to the piece of first information and calculates the fourth coverage rate of the first virtual area on the fourth boundary according to the relative positional relationships.

9. The graphic rendering system as claimed in claim 1, wherein the processing unit decides a first boundary color of the first boundary according to the first coverage rate and the first color, decides a second boundary color of the second boundary according to the second coverage rate and the first color, decides a third boundary color of the third boundary according to the third coverage rate and the first color, and decides a fourth boundary color of the fourth boundary according to the fourth coverage rate and the first color, and the processing unit decides the display color of the pixel with reference to the first boundary color, the second boundary color, the third boundary color, and the fourth boundary color.

10. The graphic rendering system as claimed in claim 1, wherein the storage unit is further configured to store a piece of second information, the piece of second information defines a second virtual area in the display frame, the processing unit further determines that the pixel overlaps a part of the second virtual area according to the piece of second information, the part of the second virtual area corresponds to a second color, the processing unit further decides a fifth coverage rate of the second virtual area on the first boundary, a sixth coverage rate of the second virtual area on the second boundary, a seventh coverage rate of the second virtual area on the third boundary, and an eighth coverage rate of the second virtual area on the fourth boundary, and the processing unit updates the display color of the pixel according to the second color, the fifth coverage rate, the sixth coverage rate, the seventh coverage rate, and the eighth coverage rate.

11. A pixel update method for a graphic rendering system, wherein the graphic rendering system comprises a processing unit and a storage unit, the storage unit has a piece of first information stored therein, and the piece of first information defines a first virtual area in a display frame, the pixel update method comprising the following steps of:
   (a) determining, by the processing unit, that a pixel in the display frame overlaps a part of the first virtual area according to the piece of first information, wherein the part of the first virtual area corresponds to a first color, and the pixel defines a first boundary, a second boundary, a third boundary, and a fourth boundary;

(b) deciding, by the processing unit, a first coverage rate of the first virtual area on the first boundary;
(c) deciding, by the processing unit, a second coverage rate of the first virtual area on the second boundary;
(d) deciding, by the processing unit, a third coverage rate of the first virtual area on the third boundary;
(e) deciding, by the processing unit, a fourth coverage rate of the first virtual area on the fourth boundary; and
(f) deciding, by the processing unit, a display color of the pixel with reference to the first color, the first coverage rate, the second coverage rate, the third coverage rate, and the fourth coverage rate.

12. The pixel update method as claimed in claim 11, wherein the pixel further defines a first corner point, a second corner point, a third corner point, and a fourth corner point, and step (a) determines that the pixel overlaps the part of the first virtual area by determining that at least one of the first corner point, the second corner point, the third corner point, and the fourth corner point is located within the first virtual area.

13. The pixel update method as claimed in claim 12, wherein the piece of first information comprises a plurality of edge functions, and step (a) determines that at least one of the first corner point, the second corner point, the third corner point, and the fourth corner point is located within the first virtual area according to the edge functions.

14. The pixel update method as claimed in claim 11, wherein the pixel further defines a first corner point, a second corner point, a third corner point, and a fourth corner point, and step (a) determines that the pixel overlaps the part of the first virtual area by determining that at least one of the first corner point, the second corner point, the third corner point, and the fourth corner point is located within the first virtual area and at least another of the first corner point, the second corner point, the third corner point, and the fourth corner point is located outside the virtual area.

15. The pixel update method as claimed in claim 11, wherein the first boundary defines a plurality of sub-boundaries, and the step (b) comprises the following steps of:
(b1) determining, by the processing unit, a relative positional relationship between each of the sub-boundaries and the first virtual area according to the piece of first information; and
(b2) calculating, by the processing unit, the first coverage rate of the first virtual area on the first boundary according to the relative positional relationships.

16. The pixel update method as claimed in claim 11, wherein the second boundary defines a plurality of sub-boundaries, and the step (c) comprises the following steps of:
(c1) determining, by the processing unit, a relative positional relationship between each of the sub-boundaries and the first virtual area according to the piece of first information; and
(c2) calculating, by the processing unit, the second coverage rate of the first virtual area on the second boundary according to the relative positional relationships.

17. The pixel update method as claimed in claim 11, wherein the third boundary defines a plurality of sub-boundaries, and the step (d) comprises the following steps of:

(d1) determining, by the processing unit, a relative positional relationship between each of the sub-boundaries and the first virtual area according to the piece of first information; and
(d2) calculating, by the processing unit, the third coverage rate of the first virtual area on the third boundary according to the relative positional relationships.

18. The pixel update method as claimed in claim 11, wherein the fourth boundary defines a plurality of sub-boundaries, and the step (e) comprises the following steps of:
(e1) determining, by the processing unit, a relative positional relationship between each of the sub-boundaries and the first virtual area according to the piece of first information; and
(e2) calculating, by the processing unit, the fourth coverage rate of the first virtual area on the fourth boundary according to the relative positional relationships.

19. The pixel update method as claimed in claim 11, wherein the step (f) comprises the following steps of:
(f1) deciding, by the processing unit, a first boundary color of the first boundary according to the first coverage rate and the first color;
(f2) deciding, by the processing unit, a second boundary color of the second boundary according to the second coverage rate and the first color;
(f3) deciding, by the processing unit, a third boundary color of the third boundary according to the third coverage rate and the first color;
(f4) deciding, by the processing unit, a fourth boundary color of the fourth boundary according to the fourth coverage rate and the first color; and
(f5) deciding, by the processing unit, the display color of the pixel with reference to the first boundary color, the second boundary color, the third boundary color, and the fourth boundary color.

20. The pixel update method as claimed in claim 11, wherein the storage unit is further configured to store a piece of second information, and the piece of second information defines a second virtual area in the display frame, the pixel update method comprising the following steps of:
(g) determining, by the processing unit, that the pixel overlaps a part of the second virtual area according to the piece of second information, wherein the part of the second virtual area corresponds to a second color;
(h) deciding, by the processing unit, a fifth coverage rate of the second virtual area on the first boundary;
(i) deciding, by the processing unit, a sixth coverage rate of the second virtual area on the second boundary;
(j) deciding, by the processing unit, a seventh coverage rate of the second virtual area on the third boundary;
(k) deciding, by the processing unit, an eighth coverage rate of the second virtual area on the fourth boundary; and
(l) updating, by the processing unit, the display color of the pixel according to the second color, the fifth coverage rate, the sixth coverage rate, the seventh coverage rate, and the eighth coverage rate.

* * * * *